May 28, 1946.    P. D. CAESAR ET AL    2,401,225
PRODUCTION OF ANTHRAQUINONE
Filed March 7, 1944
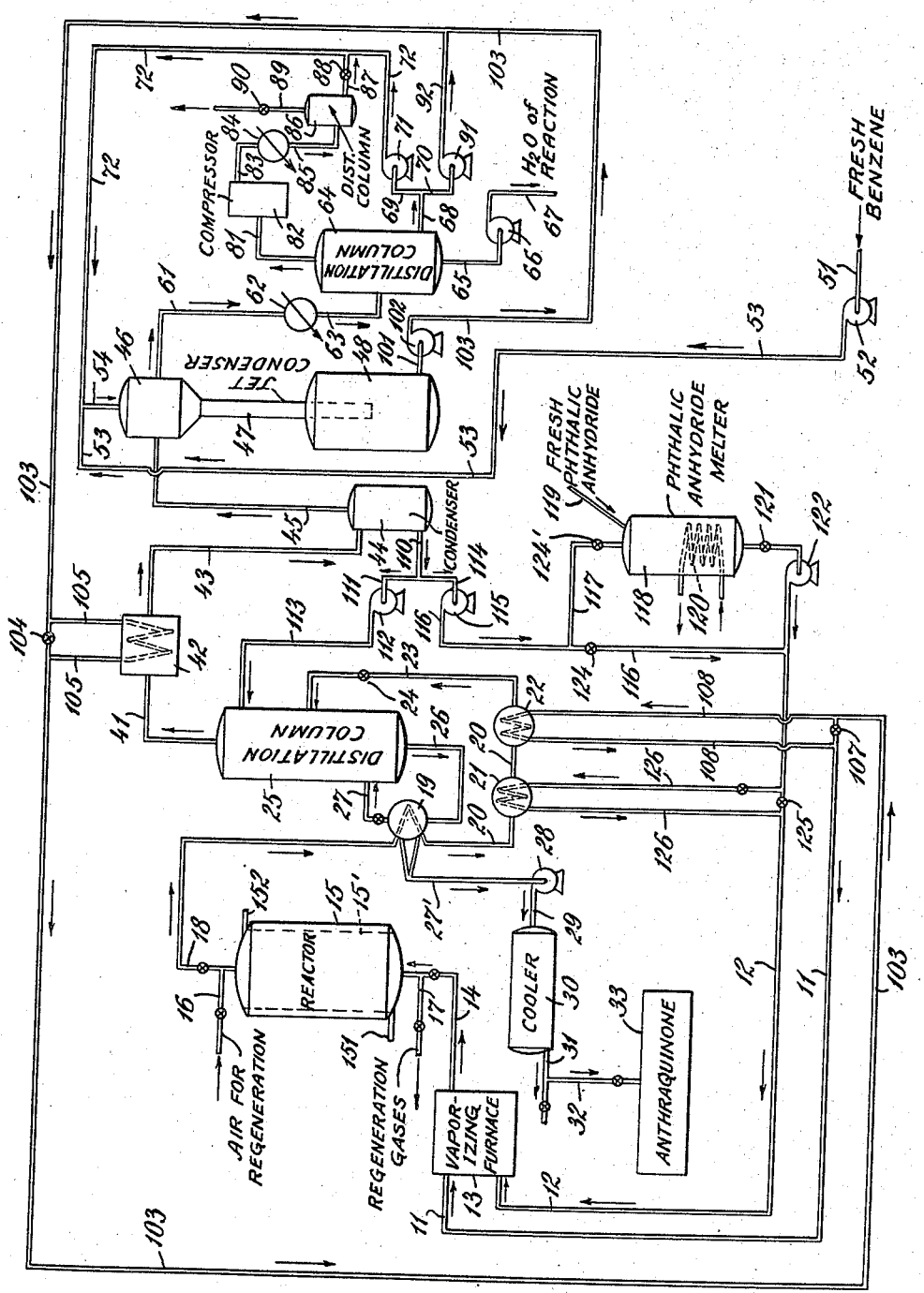
INVENTORS
PHILIP D. CAESAR
ALEXANDER N. SACHANEN
BY
ATTORNEY Patented May 28, 1946

2,401,225

UNITED STATES PATENT OFFICE 2,401,225

PRODUCTION OF ANTHRAQUINONE

Philip D. Caesar, Wenonah, and Alexander N. Sachanen, Woodbury, N. J., assignors to Socony-Vacuum Oil Company, Incorporated, a corporation of New York Application March 7, 1944, Serial No. 525,360

20 Claims. (Cl. 260—369)

This invention has to do in a general way with catalytic reactions and is more particularly concerned with the production of anthraquinone and its homologs by a novel catalytic process.

As is well known to those familiar with the art, several processes have been proposed for the production of anthraquinone. All of these processes, however, have suffered from one or more disadvantageous features and, of these processes, only two—so far as is known—have been utilized commercially. Of the latter, one process involves the oxidation of anthracene to anthraquinone. Anthracene, however, is not readily obtainable in the pure state and before it is oxidized to anthraquinone, it is essential that it be separated from phenanthrene, chrysene, fluorene and other impurities with which it is normally associated. The separation of anthracene from phenanthrene, etc., is particularly difficult and expensive in view of the close similarity in the properties of the said compounds.

The other process presently in commercial use involves a two-stage condensation of phthalic anhydride with benzene. In the first stage, phthalic anhydride and benzene are reacted in the presence of aluminum chloride, or other Friedel-Crafts catalyst, to form o-benzoyl benzoic acid. The acid thus formed is then converted to anthraquinone by contacting it with a suitable dehydrating agent, such as sulfuric acid, phosphorus pentoxide or the like. While high yields of anthraquinone are obtained in this way, the product is expensive in view of the character of the process. Primarily, the process comprises two distinct reactions such that anthraquinone is not produced directly from the initial reactants, but indirectly through an intermediate, o-benzoyl benzoic acid. Also, the process is fundamentally a batch process inasmuch as the Friedel-Crafts catalyst, for example aluminum chloride, is consumed therein. Specifically, about two mols of Friedel-Crafts catalyst are consumed for each mol of phthalic anhydride used in the reaction; this one factor alone contributes substantially to the cost of the product. In detail, this prior process involves the following consecutive operations:

(1) Reaction of phthalic anhydride and benzene in the presence of $AlCl_3$ to form o-benzoyl benzoic acid, (2) Separation of the $AlCl_3$-complex from the reaction mixture formed in (1), (3) Separation of unreacted benzene from the reaction mixture free from $AlCl_3$-complex, (4) Separation of o-benzoyl benzoic acid from the reaction mixture free of $AlCl_3$-complex and unreacted benzene, (5) Reaction of o-benzoyl benzoic acid with $H_2SO_4$ to form anthraquinone, and (6) Separation of anthraquinone from the reaction mixture formed in (5).

It has been found that anthraquinone can be prepared directly—in one reaction—and inexpensively from phthalic anhydride and benzene. Specifically, the present invention is predicated upon the discovery that phthalic anhydride and benzene react in the vapor phase to form anthraquinone directly when brought together at an elevated temperature in the presence of a catalyst of the type known as activated clays and the so-called alumina-silica catalysts. From this brief definition of the present process it will be apparent that it enjoys the advantage, over the aforesaid processes of the prior art, of being a means of preparing anthraquinone in one step. Further the catalysts which serve the purposes of the present process are inexpensive, are not consumed therein and are readily regenerated for further use. Accordingly, the present process is particularly adapted to continuous operation as well as batch operation; this characteristic is not shared by processes hitherto proposed.

Homologs of anthraquinone may also be prepared directly from homologs of benzene and of phthalic anhydride in the present process. Substituted anthraquinone may be formed directly by reacting, in the vapor phase, a substituted benzene with phthalic anhydride, benzene with a substituted phthalic anhydride, or a substituted benzene with a substituted phthalic anhydride, in the presence of a catalyst of the aforesaid type at an elevated temperature. For example, monochlorobenzene and phthalic anhydride have been so reacted to form a chloranthraquinone. Broadly, the reactants may be considered as those members of the benzene series—including benzene—and of the phthalic anhydride series—including phthalic anhydride—which are in the vapor phase under the reaction conditions of the process. The reactants contemplated herein may be further described as those of the aforesaid series which are characteristic by substantial resistance to decomposition under the said reaction conditions.

The catalysts operative in the present process are associations of silica and various amphoteric metal oxides, and particularly those of alumina, thoria and zirconia. They may be classified, for example, as active clay, and synthetic alumina-silica, thoria-silica and zirconia-silica catalysts.

Preferred of these synthetic catalysts are those which contains an excess of silica with smaller amounts of alumina, thoria and zirconia; and which may or may not contain not more than 1 per cent of a third metal or metal oxide, with the exception of alkalies or alkaline earths which should not be present in amounts greater than approximately 0.1 per cent. The active clay catalysts should conform to these same specifications, except that they should contain not more than 10 per cent of the oxides of calcium, magnesium and iron, not more than 3 per cent of said oxides being iron oxides.

Elevated temperatures of 350° C. and greater are used in the present process. Preferred, however, are temperatures of the order of 350° to 550° C., and particularly preferred are temperatures between about 370° C. and about 470° C. Temperature, to a large extent, influences the course of the reaction; if too high, for example, the yield is decreased by virtue of side reactions, such as the decomposition of benzene or phthalic anhydride or both. All of the aforesaid reaction temperatures are particularly applicable when atmospheric pressure is used. Somewhat lower temperatures may be used with lower pressures.

The yield of anthraquinone, or a homolog thereof, is affected by numerous factors of which the following are representative: ratio of reactants, ratio of charge to catalyst, contact time and rate of flow of reactants, duration of the catalytic operation, composition of the catalyst, etc.

The proportions of the reactants, as phthalic anhydride and benzene, may vary considerably. For example, equal molar proportions of the reactants may be used, and so may an excess of either reactant. It is preferred, however, to employ a phthalic anhydride to benzene weight ratio of from 1:3 to 1:10 and particularly, a ratio of 1:8. Correspondingly, the ratio of the charge, phthalic anhydride and benzene, to the catalyst may also vary widely; yet, in general, a charge to catalyst weight ratio per pass of about 2.5:1 to about 5:1 is preferred.

Another factor exerting an appreciable influence upon the yield of anthraquinone is contact time; that is the time during which the reactance are in contact with the catalyst. In order that side reactions, such as the decomposition of the individual reactants, be minimized, the contact time should be relatively short, and is defined herein as a "relatively short contact time." Although contact times from a fraction of a second to several minutes may be used herein, those of the order of 1/10 second to 1 second, and particularly from about ¼ second to about ½ second, are preferred. Related to contact time is another factor—rate of flow of reactants. By way of illustration, when 15 parts by weight of catalyst are used, a rate of flow of reactants of about 3 parts by weight to about 5 parts by weight of solution (benzene and phthalic anhydride) per minute is preferred. This rate, however, is by no means the only rate which will serve the purposes of this invention, for it will be apparent that any rate may be used so long as the contact times defined above are maintained.

The duration of the catalytic operation may vary greatly depending upon the activity and life of the catalyst. For example, it has been found that 15 parts by weight of a typical catalyst, a synthetic aluminum silicate, were deactivated after about 15 to 30 minutes of contact at about 425° C., with a vapor mixture of phthalic anhydride and benzene flowing therethrough at a rate of 3.5 parts by weight per minute. The catalyst may be reactivated by passing a stream of air therethrough under appropriate temperature conditions for a suitable length of time, as about the same period as the catalytic operation. Care should be taken that the regeneration temperature does not exceed about 625° C., lest the activity of the catalyst be impaired.

As will be readily apparent to those skilled in the art, the apparatus used in carrying out a process of the type contemplated herein may take various forms. In the accompanying drawing, Figure 1 is a diagrammatic view illustrating one form of apparatus which may be satisfactorily used in carrying on an operation for the continuous production of anthraquinone from benzene and phthalic anhydride.

Referring to the drawing for a more detailed description of a typical procedure contemplated by this invention, benzene and phthalic anhydride are conducted through conduits 11 and 12, respectively, in the proportions indicated hereinabove, to a vaporizing furnace wherein they are mixed, vaporized and heated to a temperature in the neighborhood of 385° C. The heated vapor mixture leaves the furnace through a valved conduit 14 and enters the bottom of a reactor 15 which contains a catalyst of the type defined above. In the reactor 15, the vapor mixture contacts the catalyst at a suitable temperature, for example, about 385° C. for a suitable time, all as more fully described hereinabove, and anthraquinone is formed. It will be apparent, however, that instead of mixing the reactants in the vaporizing furnace, the reactants may be vaporized separately and then admixed prior to entering the reactor, or may be admixed when contacting the catalyst in the reactor.

The reactor 15 may be a shell containing an inner shell 15' which carries a bed of catalyst, and the catalyst may be heated by a suitable heat exchange medium circulated through the space between the outer and inner shells. Connections for the inlet and discharge of the heat exchange medium are indicated at 151 and 152. Similarly, the reactor 15 may carry a number of tubes or pipes containing the catalyst, and the tubes may be heated by circulating a heat exchange medium about the outer surface of said tubes, such an arrangement as shown and described in Simpson et al. Patent No. 2,185,929. Also the reactor may be of the type shown and described in U. S. Patent No. 2,320,318, issued to Simpson et al., wherein the catalyst moves continuously through the reactor and the spent catalyst moves through a regenerator where it is revivified, and from which it is returned to the reactor. The continuous cyclic system shown in the latter patent may be readily adapted to the reaction and regeneration phases of the present process. It will also be apparent that several reactors 15, connected in series, may be used and that as the reaction is carried out in one or more of said reactors, regeneration of catalyst may be taking place in the other reactors. Other suitable reactors which may be used satisfactorily will be suggested by the foregoing.

Reference numeral 16 indicates a valved inlet conduit through which oxygen or air may be introduced into the reactor 15 to regenerate the catalyst which becomes reduced in activity through the deposition of carbonaceous materials thereon, as indicated hereinabove. The temperature of the catalyst during regeneration should be carefully controlled as discussed hereinabove. Reference numeral 17 indicates a valved outlet conduit through which regeneration gases may be recovered. It will be clear that when the regeneration operation is carried on, the valve in the inlet conduit 14 and the valve in an outlet conduit 18 will be closed.

The top of the reactor is equipped with the outlet conduit 18, joined to the conduit 16, for removing the reaction mixture formed in the reactor. In addition to anthraquinone, the reaction mixture removed through the conduit 18 contains unreacted benzene, unreacted phthalic anhydride, water of reaction, etc. The conduit 18 connects with a heat exchanger 19 wherein some of the heat carried by the reaction mixture is removed. The reaction mixture is carried from the heat exchanger 19 through a conduit 20 and heat exchangers 21 and 22, wherein a portion of the heat carried by the reaction mixture is removed, as described hereinafter. The reaction mixture passes from the heat exchanger 22 through a conduit 23, which is fitted with a pressure reducing valve 24, to a distillation column 25. The reaction mixture enters the column 25 at a temperature of about 200° C., the pressure in the column 25 being maintained at about 7 pounds per square inch absolute (350 mms.), for example. Anthraquinone collects at the bottom of the column 25 which is maintained at about 340° C., for example, and is withdrawn therefrom through a conduit 26 which connects with the heat exchanger 19 through which pass the hot reaction products from the reactor 15. A portion of the anthraquinone is returned to the bottom of the distillation column 25 through a conduit 27 in order to maintain the temperature thereof in the neighborhood of about 340° C., or within a range such that the anthraquinone is maintained in liquid phase and other reaction products are maintained in the vapor phase. It will be apparent that with the apparatus shown, part of the heat withdrawn from the reaction mixture in passing through the heat exchanger 19 is utilized to maintain the desired temperature in the lower portion of the distillation column 25.

In the apparatus as illustrated in the drawing, the bulk of the anthraquinone is carried from the conduit 26, after passing through the heat exchanger 19, to a conduit 27' which connects with the inlet side of a pump 28. The anthraquinone is discharged by the pump 28 through a conduit 29 into a cooler 30 from which it is conducted to container filling means (not shown), or is delivered through a valved conduit 32 into a storage vessel 33.

As previously indicated the conditions in the distillation column 25 are so regulated that all of the reaction products, except anthraquinone, are discharged as overhead vapors through a vapor outlet 41. In the system illustrated herein, this is accomplished by maintaining the distillation column under pressure in the neighborhood of 7 pounds per square inch absolute, and so regulating the amount of anthraquinone recirculated through the distillation column 25, by means of heat exchangers 21 and 22, that the temperatures of the vapors in the top of the column 25 are in the neighborhood of 170° C. The overhead vapors in the conduit 41 pass through heat exchanger 42 wherein they are partially cooled, and then through a conduit 43 to a partial condenser 44 wherein a portion of the unreacted phthalic anhydride is condensed, the temperature of the condenser 44 being maintained at about 150° C. in order to effect substantial condensation of the phthalic anhydride without condensation of the benzene and water vapor. The condenser may be constructed in the same manner as the reactor 15, that is, with an outer and an inner shell, and the temperature thereof may be regulated by circulating a suitable cooling medium through the space between the two shells (means not shown).

The overhead vapors from condenser 44 are conducted through an outlet conduit 45 to the upper section 46 of a jet condenser, the temperature and pressure being maintained, therein, for example, at about 60° C. and about 5 pounds per square inch absolute (250 mms.), respectively. The upper section 46 of the jet condenser is connected to a lower section 48 through a leg 47; the temperature and pressure of the lower section 48 are maintained at about 60° C. and 760 mms., respectively, and benzene and some phthalic anhydride are there condensed.

Fresh benzene is introduced into the system through a line 51 which connects with the inlet side of a pump 52, which in turn is equipped with an outlet line 53. Fresh benzene flows to the top of the jet condenser 46 through the line 53 to a conduit 54. To those skilled in the art, it will be clear that the jet of benzene introduced into the upper section of the jet condenser 46, through the conduit 54, provides a partial condensation means whereby phthalic anhydride from the conduit 45 is condensed in the said lower section 48.

The upper section 46 of the jet condenser is equipped with an outlet conduit 61 for removing the uncondensed material therein. The uncondensed material passes through the conduit 61 and a cooler 62, thence through a conduit 63 to a distillation column 64 which is kept at about 38° C. and 5 pounds per square inch absolute, for example. Water of reaction is removed from the bottom of the column 64 through an outlet line 65, which connects with the inlet side of a pump 66, and a conduit 67 which connects with the outlet side of the pump 66. Benzene is withdrawn from the column 64 through the line 68 which connects with conduits 69 and 70. A portion of the benzene is taken through the conduit 69 to the inlet side of a pump 71 which discharges into a conduit 72 connecting with the benzene inlet connection 54 on the jet condenser.

The top of the distillation column 64 is shown as equipped with an outlet conduit 81 through which the reaction gases and some benzene, in the vapor phase in the column 64, pass to a compressor 82. The compressor 82 has an outlet line 83 which connects with a cooler 84 wherein the said gases and benzene are cooled, whence they pass through a conduit 85 to a distillation column 86. The temperature and pressure in the column 86 are maintained at about 38° C. and 260 pounds per square inch absolute, for example, whereupon benzene is liquefied and may be drawn off through a conduit 87 which carries a pressure release valve 88. As shown, the conduit 87 connects with the conduit 72 and provides a means for returning the benzene taken from the column 86 to the top section of the jet condenser 46. The top of the column 86 is equipped with a line 89 carrying a pressure release valve 90, for removing gases therefrom.

Benzene may also be taken from the distillation column 64 through the line 68 to a conduit 70 which connects with the inlet side of a pump 91. Benzene is discharged from the pump 91 through a conduit 92 into a conduit 103 carrying benzene—together with some phthalic anhydride—taken from the lower section 48 of the jet condenser through an outlet connection 101 by means of a pump 102. Benzene, in the line 103, is delivered to the conduit 11 which charges the vaporizing furnace, and part or all of the benzene stream in conduit 103 may be by-passed through a line 105 and the heat exchanger 42 by regulation of the valve 104 for the purpose of preheating same. Also part or all of the benzene stream may be by-passed through the heat exchanger 22 by regulation of valve 107 for preheating purposes.

Referring back to the condenser 44 which is maintained at about 150° C., as indicated above, unreacted phthalic anhydride carried in through the line 43 is here condensed and is removed through a line 110. Part of the unreacted phthalic anhydride may be returned as reflux to the distillation column 25 through a line 111, connecting with the line 110 and the inlet side of a pump 112 which is equipped with an outlet conduit 113, the latter connecting with the upper portion of the column 25. Phthalic anhydride enters the column 25 at about 170° C., the means 110 through 113 being heated as by stream tracer lines (not shown)). The greater portion of the unreacted phthalic anhydride is taken from the line 110 through a line 114, connecting therewith, to the inlet of a pump 115. The pump 115 discharges phthalic anhydride condensate through a conduit 116 into the phthalic anhydride feed line 12. Fresh phthalic anhydride is charged to the system from a phthalic anhydride melter 118, which is equipped with an inlet line 119 through which fresh phthalic anhydride is introduced into the system, and is also equipped with a heating element, as a steam coil 120. Melted phthalic anhydride is taken from the melter 118 through a valved line 121 which connects with the inlet side of a pump 122 which discharges into the phthalic anhydride feed line 12. There is also provided a line 117, connecting with the line 116, which, by proper regulation of valves 124 and 124' may be used to deliver part or all of the condensed phthalic anhydride into melter 118. Phthalic anhydride in the line 12 may, by proper regulation of valve 125, be by-passed through conduit 126 and heat exchanger 21. Here again, heat removed from the reaction mixture in the line 20, in passing through the heat exchanger 21, may serve to heat phthalic anhydride carried in the line 108. It will be clear that the means 114 through 126 and 12 are heated, as by stream tracer lines (not shown), in order to maintain a steady flow of phthalic anhydride therein.

It will be apparent to those familiar with the art that the desired proportions of reactants—benzene and phthalic anhydride—can be maintained throughout the continuous process by regulating the amounts of fresh benzene and phthalic anhydride, and of recycle or unreacted benzene and phthalic anhydride, introduced into the reactor 15. The amount of benzene and phthalic anhydride consumed per pass—and, therefore, the amount of fresh benzene and phthalic anhydride to be added—can be determined after one pass through the system by obtaining the amount of anthraquinone formed and the amounts of unreacted benzene and phthalic anhydride recovered.

To demonstrate the efficacy of the process contemplated herein with an apparatus of the type described in connection with Figure 1, the following illustrative examples are provided below.

*Example I*

Phthalic anhydride (105 parts by weight) and benzene (820 parts by weight) were vaporized and charged to a reaction chamber (as reactor 22 in Figure 1) containing 180 parts by weight of a synthetic alumina silicate (analysis: 7.3% alumina, 92.7% silica), over a period of 22 minutes. The reaction chamber was maintained at 380° C. and the contact time was about 0.6 second. The reaction mixture obtained from the reaction chamber was processed as indicated in the discussion of Figure 1.

A quantity of anthraquinone—7.1 parts by weight—was obtained. This represents a yield of 79% of the theoretical based on the phthalic anhydride, 9 parts by weight, consumed in the process. Substantial quantities of unreacted benzene and unreacted phthalic anhydride were recovered for recycling.

*Example II*

Phthalic anhydride (99 parts by weight) and benzene (820 parts by weight) were vaporized and charged to a reaction chamber (as reactor 22 in Figure 1) containing 180 parts by weight of the synthetic alumina silicate used in Example I, over a period of 22 minutes. The alumina silicate from Example I was regenerated, before use in this example, by passing air therethrough for one hour at 510° C.

The reaction chamber was maintained at about 380° C. and the contact time was 0.6 second. Anthraquinone (6.35 parts by weight) was obtained; a yield of 79.5% of the theoretical based upon the quantity of phthalic anhydride, 8 parts by weight, consumed. Unreacted benzene and unreacted phthalic anhydride were recovered for recycling.

Anthraquinone obtained by our process hereinabove described is very pure. For example, 0.35 gram of anthraquinone so obtained was reduced by zinc and a solution of sodium hydroxide. The solution was filtered whereupon unreacted zinc and impurities were removed, and the filtrate was then oxidized by air to obtain pure anthraquinone. The quantity of pure anthraquinone was 0.33±0.01 gram.

*Example III*

Monochlorobenzene (90 parts by weight) and phthalic anhydride (10 parts by weight) were vaporized and then contacted with 15 parts by weight of the synthetic alumina silicate described in Example I, at a rate of 4.5 parts by weight per minute. The reaction chamber (as in Example I) was maintained at about 425° C. and the contact time was 0.6 second. Four parts by weight of chloranthraquinone were obtained from the reaction product, worked up as indicated hereinabove.

It is to be understood that the foregoing examples are merely illustrative of procedures and that the invention includes within its scope such changes and modifications as fairly come within the spirit of the appended claims.

The present application is a continuation-in-part of copending application Serial No. 449,778, filed July 4, 1942.

We claim:

1. The catalytic process for the direct production of an anthraquinone selected from the group consisting of anthraquinone and a substituted anthraquinone, from a compound (A) selected from the group consisting of benzene and a halogen substituted benzene, and a compound (B) selected from the group consisting of phthalic anhydride and a substituted phthalic anhydride, the said compounds (A) and (B) being in the vapor phase and being characterized by substantial resistance to decomposition under the reaction conditions hereinbelow defined, which comprises: forming a vapor mixture of a compound (A) and a compound (B); and contacting the said vapor mixture, for a relatively short contact time at an elevated temperature above about 350° C., with a catalyst comprising an association of silica and an amphoteric metal oxide.

2. The catalytic process for the direct production of an anthraquinone selected from the group consisting of anthraquinone and a substituted anthraquinone, from a compound (A) selected from the group consisting of benzene and a halogen substituted benzene, and a compound (B) selected from the group consisting of phthalic anhydride and a substituted phthalic anhydride, the said compounds (A) and (B) being in the vapor phase and being characterized by substantial resistance to decomposition under the reaction conditions hereinbelow defined, which comprises: forming a vapor mixture of a compound (A) and a compound (B); and contacting the said vapor mixture, for a relatively short contact time at an elevated temperature between about 350° C. and about 550° C., with a catalyst selected from the group consisting of activated clays and synthetic alumina-silica, thoria-silica and zirconia-silica catalysts.

3. The catalytic process for the direct production of anthraquinone from benzene and phthalic anhydride, which comprises: forming a vapor mixture of benzene and phthalic anhydride; and contacting said vapor mixture, for a relatively short contact time at an elevated temperature between about 350° C. and about 550° C., with a catalyst comprising an association of silica and an amphoteric metal oxide.

4. The catalytic process for the direct production of anthraquinone from benzene and phthalic anhydride, which comprises: forming a vapor mixture of benzene and phthalic anhydride; and contacting said vapor mixture, for a relatively short contact time at an elevated temperature between about 350° C. and about 550° C., with a catalyst selected from the group consisting of activated clays and synthetic alumina-silica, thoria-silica and zirconia-silica catalysts.

5. The catalytic process for the direct production of anthraquinone from benzene and phthalic anhydride, which comprises: forming a vapor mixture of benzene and phthalic anhydride; and contacting said vapor mixture, for a contact time from about 0.1 second to about 1 second at an elevated temperature between about 350° C. and about 550° C., with a catalyst selected from the group consisting of activated clays and synthetic alumina-silica, thoria-silica and zirconia-silica catalysts.

6. The catalytic process for the direct production of anthraquinone from benzene and phthalic anhydride, which comprises: forming a vapor mixture of from about three to about ten parts by weight of benzene and one part by weight of phthalic anhydride; and contacting said vapor mixture, for a relatively short contact time at an elevated temperature between about 350° C. and about 550° C., with a catalyst selected from the group consisting of activated clays and synthetic alumina-silica, thoria-silica and zirconia-silica catalysts.

7. The catalytic process for the direct production of anthraquinone from benzene and phthalic anhydride, which comprises: forming a vapor mixture of about eight parts by weight of benzene and one part by weight of phthalic anhydride; and contacting said vapor mixture, for a contact time of about 0.6 second at about 380° C., with a synthetic alumina-silica catalyst.

8. The catalytic process for the direct production of a halogenated anthraquinone from a halogenated benzene and phthalic anhydride, which comprises: forming a vapor mixture of said halogenated benzene and phthalic anhydride; and contacting said vapor mixture for a relatively short contact time at a temperature between about 350° C. and about 550° C., with a catalyst comprising an association of silica and an amphoteric metal oxide.

9. The catalytic process for the direct production of a chloroanthraquinone from monochlorobenzene and phthalic anhydride, which comprises: forming a vapor mixture of about nine parts by weight of monochlorobenzene and one part by weight of phthalic anhydride; and contacting said vapor mixture, for a contact time of about 0.6 second at about 425° C., with a synthetic alumina-silica catalyst.

10. The continuous catalytic process for the direct production of an anthraquinone selected from the group consisting of anthraquinone and a substituted anthraquinone, from a compound (A) selected from the group consisting of benzene and a halogen substituted benzene, and a compound (B) selected from the group consisting of phthalic anhydride and a substituted phthalic anhydride, the said compounds (A) and (B) being in the vapor phase and being characterized by substantial resistance to decomposition under the reaction conditions hereinbelow defined, which comprises: forming a vapor mixture of a compound (A) and of a compound (B); contacting said vapor mixture, for a relatively short contact time at an elevated temperature above about 350° C., with a catalyst comprising an association of silica and an amphoteric metal oxide, thereby forming said anthraquinone; separating said anthraquinone from the reaction mixture formed in the preceding operation; and recycling over said catalyst, in the vapor phase under the aforesaid reaction conditions, the said reaction mixture, free of said anthraquinone, with a quantity of fresh compound (A) and fresh compound (B) to replace compound (A) and compound (B) consumed in the said preceding operation.

11. The continuous catalytic process for the direct production of an anthraquinone selected from the group consisting of anthraquinone and a substituted anthraquinone, from a compound (A) selected from the group consisting of benzene and a halogen substituted benzene, and a compound (B) selected from the group consisting of phthalic anhydride and a substituted phthalic anhydride, the said compounds (A) and (B) being in the vapor phase and being characterized by substantial resistance to decomposition under the reaction conditions hereinbelow defined, which comprises: forming a vapor mixture of a compound (A) and of a compound (B); contacting said vapor mixture, for a relatively short contact time at an elevated temperature above about 350° C., with a catalyst comprising an association of silica and an amphoteric metal oxide, thereby forming said anthraquinone; separating said anthraquinone, unreacted compound (A) and unreacted compound (B) from the reaction mixture formed in the preceding operation; and recycling over said catalyst, in the vapor phase under the aforesaid reaction conditions, said unreacted compound (A) and said unreacted compound (B) with a quantity of fresh compound (A) and fresh compound (B) to replace compound (A) and compound (B) consumed in the said preceding operation.

12. The continuous catalytic process for the direct production of an anthraquinone selected from the group consisting of anthraquinone and a substituted anthraquinone, from a compound (A) selected from the group consisting of benzene and a halogen substituted benzene, and a compound (B) selected from the group consisting of phthalic anhydride and a substituted phthalic anhydride, the said compounds (A) and (B) being in the vapor phase and being characterized by substantial resistance to decomposition under the reaction conditions hereinbelow defined, which comprises: forming a vapor mixture of a compound (A) and of a compound (B); contacting said vapor mixture, for a relatively short contact time at an elevated temperature between about 350° C. and about 550° C., with a catalyst selected from the group consisting of activated clays and synthetic silica-alumina, silica-thoria and silica-zirconia catalysts, thereby forming said anthraquinone; separating said anthraquinone, unreacted compound (A) and unreacted compound (B) from the reaction mixture formed in the preceding operation; and recycling over said catalyst, in the vapor phase under the aforesaid reaction conditions, said unreacted compound (A) and said unreacted compound (B), with a quantity of fresh compound (A) and fresh compound (B) to replace compound (A) and compound (B) consumed in the said preceding operation.

13. The continous process for the direct production of anthraquinone from benzene and phthalic anhydride, which comprises: forming a vapor mixture of benzene and phthalic anhydride; contacting said vapor mixture, for a relatively short contact time at an elevated temperature between about 350° C. and about 550° C., with a catalyst comprising an association of silica and an amphoteric metal oxide, thereby forming anthraquinone; separating said anthroquinone, unreacted benzene and unreacted phthalic anhydride from the reaction mixture formed in the preceding operation; and recycling over said catalyst, in the vapor phase under the aforesaid reaction conditions, said unreacted benzene and said unreacted phthalic anhydride with a quantity of fresh benzene and fresh phthalic anhydride to replace benzene and phthalic anhydride consumed in the said preceding operation.

14. The continuous process for the direct production of anthraquinone from benzene and phthalic anhydride, which comprises: forming a vapor mixture of benzene and phthalic anhydride; contacting said vapor mixture, for a relatively short contact time at an elevated temperature between about 350° C. and about 550° C., with a catalyst selected from the group consisting of activated clays and synthetic alumina-silica, thoria-silica and zirconia-silica catalysts, thereby forming anthraquinone; separating said anthraquinone, unreacted benzene and unreacted phthalic anhydride from the reaction mixture formed in the preceding operation; and recycling over said catalyst, in the vapor phase under the aforesaid reaction conditions, said unreacted benzene and said unreacted phthalic anhydride with a quantity of fresh benzene and fresh phthalic anhydride to replace benzene and phthalic anhydride consumed in the said preceding operation.

15. The continuous process for the direct production of anthraquinone from benzene and phthalic anhydride, which comprises: forming a vapor mixture of benzene and phthalic anhydride; contacting said vapor mixture for a contact time from about 0.1 second to about 1 second at an elevated temperature between about 350° C. and about 550° C., with a catalyst selected from the group consisting of activated clays and synthetic alumina-silica, thoria-silica and zirconia-silica catalysts, thereby forming anthraquinone; separating said anthraquinone, unreacted benzene and unreacted phthalic anhydride from the reaction mixture formed in the preceding operation; and recycling over said catalyst, in the vapor phase under the aforesaid reaction conditions, said unreacted benzeen and said unreacted phthalic anhydride with a quantity of fresh benzeen and fresh phthalic anhydride to replace benzene and phthalic anhydride consumed in the said preceding operation.

16. The continuous process for the direct production of anthraquinone from benzene and phthalic anhydride, which comprises: forming a vapor mixture of from about three to about ten parts by weight of benzene and about one part by weight of phthalic anhydride; contacting said vapor mixture, for a relatively short contact time at an elevated temperature between about 350° C. and about 550° C., with a catalyst selected from the group consisting of activated clays and synthetic alumina-silica, thoria-silica and zirconia-silica catalysts, thereby forming anthraquinone; separating said anthraquinone, unreacted benzene and unreacted phthalic anhydride from the reaction mixture formed in the preceding operation; and recycling over said catalyst, in the vapor phase under the aforesaid reaction conditions, said unreacted benzene and said unreacted phthalic anhydride with a quantity of fresh benzene and fresh phthalic anhydride to replace benzene and phthalic anhydride consumed in the said preceding operation.

17. The continuous process for the direct production of anthraquinone from benzene and phthalic anhydride, which comprises: forming a vapor mixture of about eight parts by weight of benzene and one part by weight of phthalic anhydride; contacting said vapor mixture, for a contact time of about 0.6 second at about 380° C., with a synthetic alumina-silica catalyst, thereby forming anthraquinone; separating said anthraquinone, unreacted benzene and unreacted phthalic anhydride from the reaction mixture formed in the preceding operation; and recycling over said catalyst, in the vapor phase under the aforesaid reaction conditions, said unreacted benzene and said unreacted phthalic anhydride with a quantity of fresh benzene and fresh phthalic anhydride to replace benzene and phthalic anhydride consumed in the said preceding operation.

18. The catalytic process for the direct production of a halogenated anthraquinone from a halogenated benzene and phthalic anhydride, which comprises: forming a vapor mixture of said halogenated benzene and phthalic anhydride; contacting said vapor mixture, for a relatively shart contact time at a temperature between about 350° C. and about 550° C., with a catalyst comprising an association of silica and an amphoteric metal oxide; thereby forming said halogenated anthraquinone; separating said halogenated anthraquinone, unreacted halogenated benzene and unreacted phthalic anhydride from the reaction mixture formed in the preceding operation; and recycling over said catalyst, in the vapor phase under the aforesaid reaction conditions, said unreacted halogenated benzene and said unreacted phthalic anhydride with a quantity of fresh halogenated benzene and fresh phthalic anhydride to replace halogenated benzene and phthalic anhydride consumed in the said preceding operation.

19. The catalytic process for the direct production of a chloroanthraquinone from monochlorobenzene and phthalic anhydride, which comprises: forming a vapor mixture of about nine parts by weight of monochlorobenzene and one part by weight of phthalic anhydride; contacting said vapor mixture, for a contact time of about 0.6 second at about 425° C., with a synthetic alumina-silica catalyst, thereby forming said chloroanthraquinone; separating said chloroanthraquinone, unreacted monochlorobenzene and unreacted phthalic anhydride from the reaction mixture formed in the preceding operation; and recycling over said catalyst, in the vapor phase under the aforesaid reaction conditions, said unreacted monochlorobenzene and said unreacted phthalic anhydride with a quantity of fresh monochlorobenzene and fresh phthalic anhydride to replace monochlorobenzene and phthalic anhydride consumed in the said preceding operation.

20. The catalytic process for the direct production of anthraquinone from benzene and phthalic anhydride, which comprises: forming a vapor mixture of benzene and phthalic anhydride; and contacting said vapor mixture, for a relatively short contact time at an elevated temperature and under reduced pressure, with a catalyst comprising an association of silica and an amphoteric metal oxide.

PHILIP D. CAESAR.
ALEXANDER N. SACHANEN.